United States Patent [19]

Benhamou et al.

[11] Patent Number: 4,849,489

[45] Date of Patent: Jul. 18, 1989

[54] CONTINUOUS PROCESS AND SYSTEM FOR PRODUCING POLYMERS COMPRISING MALEIC ANHYDRIDE AND CERTAIN ALPHA-OLEFINS

[75] Inventors: Franck E. Benhamou, Greenfield; Kenneth R. Lukow; Calvin J. Verbrugge, both of Racine, all of Wis.

[73] Assignee: S. C. Johnson & Son, Inc., Racine, Wis.

[21] Appl. No.: 84,044

[22] Filed: Aug. 11, 1987

[51] Int. Cl.$^4$ ............................................. C08F 2/00
[52] U.S. Cl. ...................... 526/208; 526/216; 526/227; 526/228; 526/272
[58] Field of Search ............... 526/272, 208, 216, 227, 526/228

[56] References Cited

U.S. PATENT DOCUMENTS

| | | | |
|---|---|---|---|
| Re. 28,475 | 7/1975 | Blecke et al. | 526/272 |
| 2,857,365 | 10/1958 | Johnson | 526/272 |
| 2,913,437 | 11/1959 | Johnson | 526/272 |
| 2,938,016 | 5/1960 | Johnson | 526/272 |
| 2,980,653 | 4/1961 | Johnson | 526/272 |
| 3,461,108 | 8/1969 | Heilman et al. | 526/272 |
| 3,488,311 | 1/1970 | Burdick et al. | 524/517 |
| 3,553,177 | 1/1971 | Hazen et al. | 526/208 |
| 3,560,455 | 2/1971 | Hazen et al. | 526/272 |
| 3,560,456 | 2/1971 | Hazen et al. | 526/272 |
| 3,560,457 | 2/1971 | Hazen et al. | 526/272 |
| 3,954,720 | 5/1976 | Spoor et al. | 526/75 |
| 4,026,967 | 5/1977 | Flexman, Jr. et al. | 525/52 |
| 4,090,998 | 5/1978 | Dirks et al. | 526/272 |
| 4,202,955 | 5/1980 | Gaylord | 526/272 |
| 4,250,289 | 2/1981 | Denzinger et al. | 526/201 |
| 4,358,573 | 11/1982 | Verbrugge | 526/272 |
| 4,370,454 | 1/1983 | Messmer et al. | 526/88 |
| 4,526,950 | 7/1985 | Grava | 526/272 |

Primary Examiner—Joseph L. Schofer
Assistant Examiner—J. M. Reddick

[57] ABSTRACT

A continuous process and system for producing a polymer comprising maleic anhydride and alpha-olefin monomeric units is disclosed. The process comprises combining monomeric reactants comprising the maleic anhydride and the alpha-olefin, in the presence of a minimal effective amount of a solvent, to produce a polymerizable reaction mixture. The solvent is present in minimal amounts, namely, at about 2 to about 9 weight percent, based upon the weight of the reaction mixture. The polymerizable reaction mixture is heated; and at least one thermally-decomposable initiator is added to the thus-heated, polymerizable reaction mixture to initiate the polymerization reaction. The presence of the initiator causes the maleic anhydride and the alpha-olefin to polymerize, thereby producing the desired polymer. An effective additional amount of the monomeric reactants as well as an additional effective amount of solvent, are controllably and substantially continuously added to the reaction mixture, for maintaining the desired polymerization reaction. The produced polymer is thereafter continuously removed from the reaction mixture.

11 Claims, 2 Drawing Sheets

CONTINUOUS PROCESS AND SYSTEM FOR PRODUCING POLYMERS COMPRISING MALEIC ANHYDRIDE AND CERTAIN ALPHA-OLEFINS

FIELD OF THE INVENTION

One aspect of the present invention is directed to a continuous process, as well as to a system, for producing via quasi-bulk solution polymerization, certain polymers, in the presence of relatively minimal amounts of solvent. Such polymers comprise maleic anhydride and certain alpha-olefins.

Yet another aspect of the present invention is directed to such a continuous process, and to such a system, wherein the thus-produced polymer comprises from about 40 to up to as much as about 60 mole percent maleic anhydride, and about 40 to about 60 mole percent of certain alpha-olefins having about 6 to more than about 30 carbon atoms.

A yet further aspect of the present invention is directed to such a process, and to such a system, wherein the thus-produced polymers can comprise maleic anhydride and at least two, "different" alpha-olefins (i.e., alpha-olefins of different chain lengths).

BACKGROUND OF THE INVENTION

As one of us (Verbrugge) disclosed in U.S. Pat. No. 4,358,573, polymers comprising (1) maleic anhydride, (2) at least one "lower" 1-alkene (i.e., an alpha-olefin having from about 4 to about 16 carbon atoms in its carbon chain), and (3) at least one "higher" 1-alkene (i.e., an alpha-olefin having about 18 or more carbon atoms in its carbon chain) are known to possess certain "waxy" qualities, which is desirable in certain applications. For example, possessing such "waxy" qualities enables certain polymers to be used as mold-release agents and other so-called "slip" agents, as well as certain additives to floor polish formulations, other surface-formulation compositions, and the like. In particular, polymers of this sort typically function as water-soluble anti-redeposition agents, and accordingly, such polymers can generally be readily formulated into a variety of compositions, one such composition being a liquid-detergent formulation.

Methods for producing polymers comprising maleic anhydride and alpha-olefin monomeric units are generally well known and are disclosed, for example, in U.S. Pat. No. 3,461,108 to Heilman et al.; U.S. Pat. No. 3,488,311 to Burdick et al.; as well as U.S. Pat. Nos. 3,553,177; 3,560,455; 3,560,456; 3,560,457, all to Hazen et al.; and U.S. Pat. No. 4,250,289 to Denzinger et al. While these patents collectively disclose a variety of processes—as well as a variety of systems—to produce a complementary variety of desired polymer products, each disclosed process and system requires utilizing either a highly-specific solvent or a complex, so-called "solvent system" (i.e., generally involving a complex solvent mixture), or both, to produce the disclosed polymer. Moreover, these patents each teach using relatively significant amounts of solvent, which can be economically undesirable because such solvent is typically ultimately separated from the thus-produced polymer. In particular, the solvent separation step, oftentimes performed utilizing conventional or so-called "improved" distillation techniques and equipment, can be costly.

In particular, many solvent-based polymerization-reaction processes and systems, such as those disclosed in the above-identified patents, are oftentimes economically unattractive, and thus are generally not widely practiced commercially. Still more particularly, the "economic unattractiveness" generally comes about not only because the solvent must be separated (i.e. "stripped") from the thus-produced polymer before such polymer can be utilized for its intended purpose, but also because certain, occasionally relatively "specific" pieces of processing equipment—many typically involving capital investment, maintenance, and manpower to operate—are required.

Accordingly, it would be desirable to produce polymers, of the type discussed herein, in a process—as well as in a system—that utilizes a relatively inexpensive, solvent-lean reaction medium, and which involves, as a result, minimal solvent-extraction expense.

SUMMARY OF THE INVENTION

One aspect of the present invention is directed to a continuously-operable process—as well as to a continuously-operable system—for producing, via solution polymerization, polymers comprising maleic anhydride (MAH) and certain polymerizable alpha-olefins. Such polymers are produced, in particular, in a relatively solvent-lean reaction medium.

One reason that appreciable quantities of solvent are utilized in conventional processes that react MAH with alpha-olefins to produce polymers comprising these monomeric units is to dissipate heat of reaction, as the polymerization reaction is typically considerably exothermic. Another reason is to enable the MAH and selected alpha-olefin to polymerize in the liquid phase. For example, it is well-known that MAH is relatively immiscible in $C_{10}$ alpha-olefin and that, as a result, a solvent having a solubility such that both reactants are able to be dissolved therein is typically utilized to effect liquid-phase polymerization of these two reactants.

We have discovered, however, certain situations where relatively minimal amounts of solvent can be utilized to effect the desired polymerization reaction in the liquid phase. For example, we have discovered certain situations where utilizing as little solvent as about 2 to about 4 wt.-%, based upon the weight of the reaction mixture, can result in the production of a desired polymer from MAH and $C_{10}$ alpha-olefin monomeric reactants, utilizing a so-called "continuous" process.

As used herein, the term "continuous reactor" includes the so-called "continuous stirred-tank reactor" (CSTR) as well as the so-called "plug-flow" (or tubular) reactor, but not the so-called "batch" reactor. (See, e.g., *Chemical Reaction Engineering*, by Octave Levenspiel, published 1967 by John Wiley and Sons, Inc.)

The present invention can briefly best be described by way of a series of process steps. One such process step comprises combining, in a reaction zone, certain monomeric reactants in the presence of a relatively minimal effective amount of a commercially-available, preselected solvent, to thereby produce a polymerizable reaction mixture in the reaction zone. The solvent is present in minimal amounts, namely, generally at about 2 to about 9 weight percent (or slightly more), based upon the weight of the reaction mixture, which is a significant economic improvement over the above-mentioned well-known processes. Preferably, however, the solvent is present in an amount of about 4 to about 9 weight percent, based upon the weight of the reaction mixture. The solvent, in general, should of course not be a solvent having certain well-known reactive groups—such as hydroxyl, carboxyl, or aldehyde groups—as such groups would tend to undesirably react with the maleic anhydride that is present. Accordingly, the solvent may in general be any solvent having groups which would not undesirably react with the maleic anhydride—such as an ester or an aromatic solvent—and which is a liquid at the steady-state polymerization reaction temperature and pressure contemplated.

A subsequent process step comprises heating the polymerizable reaction mixture to its so-called "incipient" polymerization-reaction temperature. Typically, this involves supplying heat to the reaction zone, utilizing a suitable heat-transfer medium.

As used herein, the term "incipient" polymerization is that initial stage of polymerization where the monomeric reactants begin to polymerize, thereby producing the polymer as a result. The incipient polymerization-reaction temperature can be, and oftentimes is, lower than a desired, so-called "steady-state" reaction temperature, which term will be further discussed hereinbelow.

Yet another process step comprises adding a thermally-decomposable initiator, or mixture of such initiators, to the thus-heated, polymerizable reaction mixture, thereby to initiate the polymerization reaction, causing the monomeric reactants to produce the desired polymer.

A yet additional process step preferably comprises controllably and substantially continuously adding to the reaction mixture an additional effective amount of the monomeric reactants, together with the relatively minimal effective amount of solvent, generally at a temperature that is lower than the steady-state polymerization temperature, in such a manner as to maintain the desired reaction mixture at substantially the steady-state reaction temperature. In particular, the monomeric reactants and solvents are preferably added in a manner such that the reaction, which is exothermic, raises the temperature of the reaction mixture from the incipient polymerization temperature substantially to the desired steady-state polymerization reaction temperature.

Typically, however, separate cooling equipment, which is in a heat-transfer relationship with the reaction zone, is utilized—in combination with the addition of the relative-cool monomeric reactants and solvent being added to the reaction mixture for removing the exothermic so-called "heat of reaction" (as described immediately above)—to thereby maintain the reaction mixture at the desired steady-state reaction temperature.

A further process step comprises continuously separating the thus-produced polymer from the remainder of the reaction mixture.

The thus-produced polymer typically comprises about 40 to about 60 mole percent maleic anhydride, and about 40 to about 60 mole percent of certain alpha-olefins having about 6 to more than about 30 carbon atoms. In particular, the thus-produced polymer can include, in addition to maleic anhydride, at least two alpha-olefins of different carbon-chain length.

The process of the present invention, as well as a variety of systems embodying certain principles of the present invention, will more particularly be discussed further hereinbelow.

Figure 1:
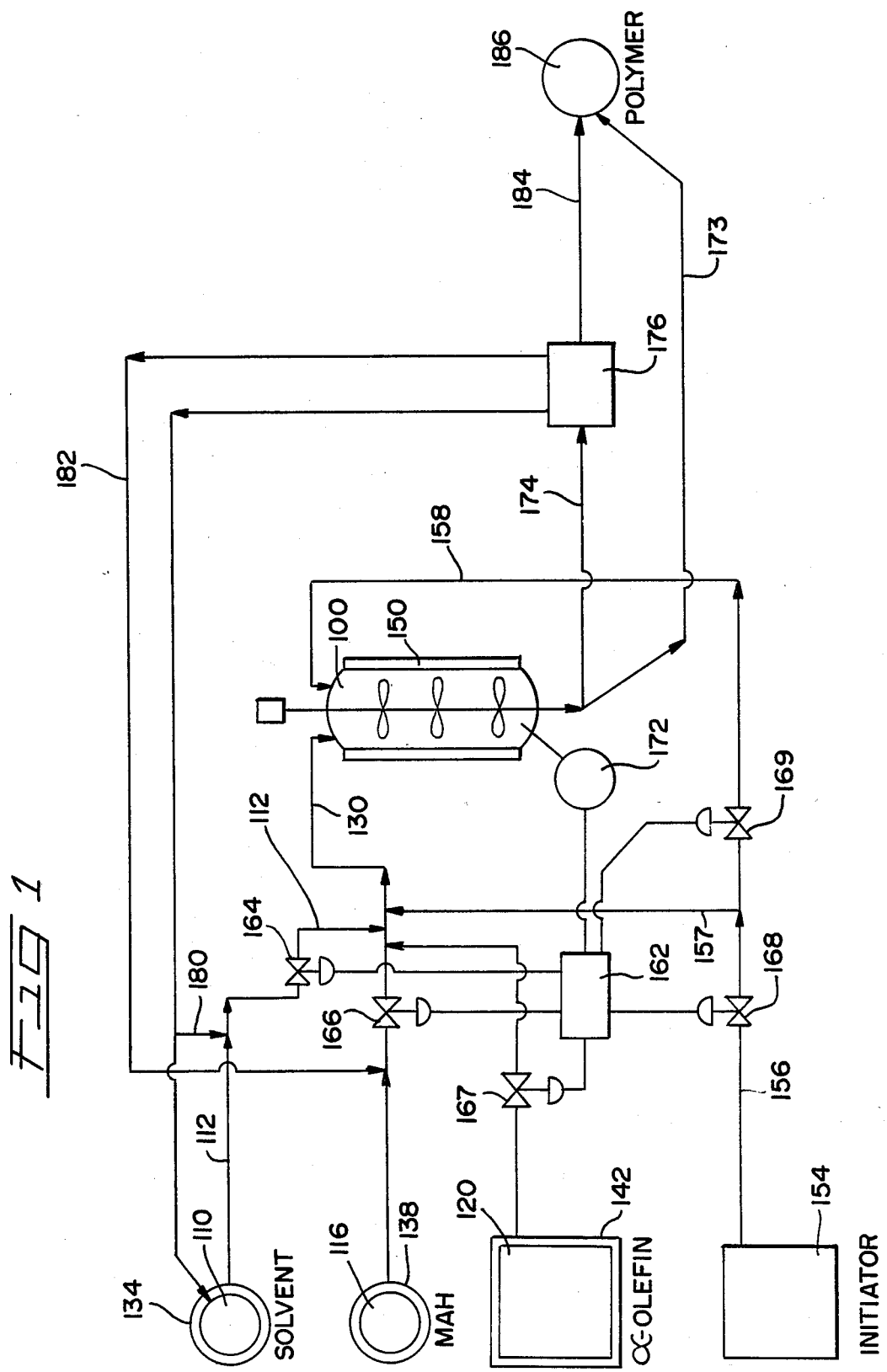
FIG. 1 is a schematic representation of one system embodying certain principles of the present invention.

Throughout the drawings, like reference numerals are used to refer to like system components or other system parts, whereas unlike system components or elements—as between the two illustrated systems—are identified by different three-digit series of numerals. In particular, parts or components—among the illustrated systems—that are the same or that are similar are referred to by numerals having the same last two digits. For example, certain components identified by reference numerals of the 100-series in FIG. 1 which are the same as or similar to certain other components presented in FIG. 2 are identified by reference numerals of the 200-series in FIG. 2.

DETAILED DESCRIPTION OF ILLUSTRATED EMBODIMENTS

While the present invention is susceptible to embodiment in various forms, there are shown in the accompanying drawings and hereinafter described in detail, several processes as well as a variety of systems embodying the principles of the present invention. The present disclosure, therefore, is to be considered merely as an exemplification of the present invention disclosed herein, without limitation to the specific embodiments illustrated.

In the ensuing detailed description, certain terms will be used for purposes of conciseness and to otherwise elucidate the features and advantages of the present invention. These terms are defined hereinbelow.

The term "melt" (also sometimes referred to, by those skilled in the art, as "polymer melt") as used herein means that molten state where monomeric reactants, though possessing significant viscosity, are able to move past one another if a sufficient motive force is applied.

The term "$M_z$" as used herein means the molecular weight measure for polymers, also sometimes referred to as the "sedimentation-average molecular weight", as defined in U.S. Pat. No. 4,529,787 to Schmidt et al. (assigned to S. C. Johnson & Son, Inc., Racine, Wis.) hereby incorporated by reference.

The term "room temperature" as used herein means about 25° C.

The term "solution" as used herein means a uniformly dispersed mixture, at the molecular or ionic level, of one or more dissolvable substances (called the "solute") in one or more dissolving substances (called the "solvent"). The solute and solvent portions of a solution are called "phases" of a solution system. Well-known solution systems include liquid/liquid solution systems (such as alcohol/water); solid/liquid solution systems (such as salt/water); solid/solid solution systems (such as carbon/iron); gas/gas solution systems (such as $CO_2$ in air); and the like.

Figure 2:
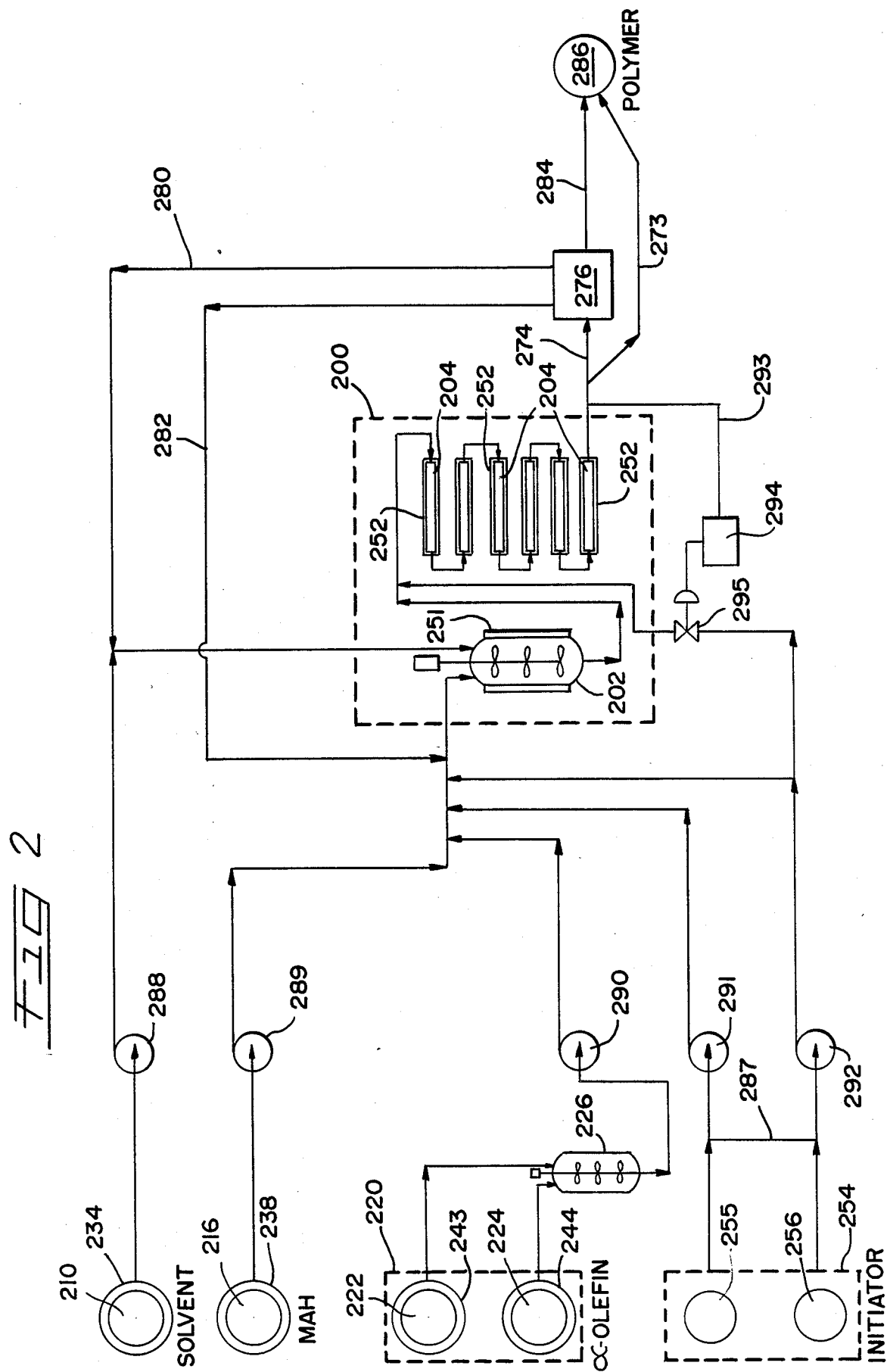
FIG. 2 is a schematic representation of yet another system, illustrating one embodiment of a reactor means, in accordance with the principles of the present invention.

Referring initially to FIG. 1, a system which can be utilized to continuously produce a polymer comprising maleic anhydride (MAH) and certain alpha-olefin monomeric units is shown schematically. In accordance with one aspect of the present invention, it is contemplated that the "certain" alpha-olefins mentioned above can include an alpha-olefin mixture. Such an alpha-olefin mixture typically comprises a first alpha-olefin having from about 6 to more than about 30 carbon atoms and a second alpha-olefin having a different carbon chain length.

The illustrated system includes an agitated, continuous reactor means 100 for combining certain polymerizable monomeric reactants with solvent, in a reaction zone, to produce a so-called "quasi-bulk" polymerizable reaction mixture. In particular, the continuous reactor means 100 defines the reaction zone.

Such polymerizable monomeric reactants comprise maleic anhydride and certain polymerizable alpha-olefins.

As mentioned above, conventional processes that produce polymers from MAH and certain alpha-olefins typically require relatively significant amounts of solvent. However, we have discovered (and disclose herein) a process that uses considerably less solvent than conventional processes to produce desired polymer products that are derived from MAH and certain polymerizable alpha-olefins.

In particular, the desired polymer is produced via a quasi-bulk melt-type polymerization reaction. In accordance with the present invention, the solvent is typically present in relatively minimal amounts, namely, at a level of about 2 to about 9 weight percent (or slightly more), preferably about 4 to about 9 weight percent, based upon the weight of the reaction mixture. That is, utilizing one particular, desired alpha-olefin, the solvent is typically present at a level of about 4 weight percent, based upon the weight of the reaction mixture; and while utilizing a particular, desired alpha-olefin mixture, the solvent is typically present at a level of about 9 weight percent.

In contradistinction, the above-mentioned U.S. Patents (for example, U.S. Pat. No. 3,461,108 to Heilman et al.; as well as U.S. Pat. No. 3,553,177; U.S. Pat. No. 3,560,455; U.S. Pat. No. 3,560,456; and U.S. Pat. No. 3,560,457, all to Hazen et al.) disclose processes that use relatively greater amounts of solvent; and such processes are oftentimes referred to in the art as "solution-type" polymerization processes.

As is well known, MAH and alpha-olefins are relatively immiscible. Yet it is desirable to get these two polymerizable monomeric ingredients into intimate contact for purposes of effecting the desired polymerization reaction. Conventionally, a relatively major amount of solvent is employed so that these monomeric ingredients are brought into intimate contact. Unfortunately, subsequent separation of the solvent from the polymer product can be costly and is thus undesirable.

We have discovered that a relatively minimal amount of solvent, in which the MAH and alpha-olefin monomeric reactants are both soluble, can be employed to effect desirable polymerization of the monomeric reactants. The amount of solvent is not so plentiful that the monomeric reactants together with the solvent form a solution. Yet the polymerization that takes place is not "bulk polymerization" (a term well known in the art); and we have accordingly adopted the term "quasi-bulk polymerization" to describe the type of polymerization reaction that we employ.

In particular, the solvent limits that we herein describe have been found adequate for the purpose of bringing the reacting monomer species into contact, that is sufficiently intimate, so that the reacting monomeric species react together in a desirable manner in a reasonable amount of time. The reaction times disclosed herein, for producing the desired polymer product, are on the order of minutes, which is highly desirable in a manufacturing-plant environment.

We have further discovered that the above-mentioned relatively minimal solvent amounts or levels provide certain other advantages as well. For example, it is generally well known that bulk polymerization—of, say, MAH in the presence of $C_6$ to $C_{10}$ alpha-olefin monomers—produces a relatively significantly-viscous melt which, because of its viscosity, may be difficult to pump or otherwise process. Specifically, at a temperature of about 150° to about 160° C. (i.e., about 302° to about 320° F.), one particular melt, for instance, comprising, e.g., molten $C_{10}$ alpha-olefin monomer can have a viscosity of about 14,100 centipoises (cps) to about 1600 cps. (That is, the 14,100 cps viscosity value is determined at a temperature of about 149° C. while the 1600 cps value is determined at about 163° C.) We have discovered, however, that the minimal solvent amounts disclosed herein substantially reduce the viscosity of the melt disclosed herein (as compared to a so-called "true" bulk-polymerizable reaction mixture), which tends to virtually eliminate the high-viscosity problems typically encountered in conventional bulk-polymerization processes.

Accordingly, further discussing the process and system illustrated by FIG. 1, it can be seen that solvent is transferred from a source 110 and conveyed via a conduit 112 into the agitated, continuous reactor means 100. MAH from a separate source 116 and alpha-olefin from yet another source 120 are preferably combined not only together but also with the solvent; and the resultant admixture is thereafter preferably conveyed via a conduit 130 into the reactor means 100.

Solvent is typically present in the reactor means 100, in accordance with one of the principles of the present invention, at about 2 to about 9 weight percent (or slightly more), preferably about 4 to about 9 weight percent, based upon the weight of the reaction mixture.

The reaction mixture comprises the monomeric reactants, the desired polymer product (which is typically soluble in the monomeric reactants), and the solvent. The desired polymerization reaction takes place in the reaction zone.

When utilizing one particular alpha-olefin reactant, the solvent is preferably present in the continuous reactor means 100 at about 4 weight percent, based upon the weight of the reaction mixture. Moreover, when utilizing one particular mixture of alpha-olefin reactants, the solvent is preferably present in the continuous reactor means 100 at about 9 weight percent, based upon the weight of the reaction mixture.

Each of the above-mentioned ingredient sources, namely, the solvent source 110, the MAH source 116, and the alpha-olefin source 120, can be equipped with its own suitable heating means, such as respective heating jackets 134, 138, and 142, for controlably raising the temperature of the solvent, the maleic anhydride, and the alpha-olefin, respectively, from a lower temperature (such as room temperature) to a higher temperature. For example, such a high temperature can be the incipient polymerization reaction temperature.

The continuous reactor means 100, moreover, can also be equipped with its own suitable heating/cooling jacket 150. For example, reactor jacket 150, when required to be used as a "heating" jacket, can thus be utilized for raising the temperature of the reactor-contained mixture to a desired temperature from a lower temperature. Further, reactor jacket 150, when required to be used as a "cooling" jacket, can also be utilized for maintaining the reaction mixture at a desired reaction temperature.

Suitable heating means include, but are not limited to steam and/or hot-water coils, steam and/or hot-water jackets, and the like. Whereas suitable cooling means include, but are not limited to, jackets and/or coils containing water, refrigerated brine, refrigerants such as gaseous ammonia, and the like.

Initiator, from a source 154, is also transferred into the continuous reactor means 100 via a conduit 156. In particular, the initiator can be combined with the admixture in conduit 130 via a conduit 157, or the initiator can be added directly into the continuous reactor means 100 via a conduit 158, as desired. The initiator, which is thermally decomposable, is utilized to initiate the desired polymerization reaction.

The reaction is exothermic. Over time, the exothermic polymerization reaction causes the reactor-contained reaction mixture to increse in temperature from the incipient polymerization reaction temperature to a higher temperature. In particular, as soon as the exothermic reaction has gotten underway, the reactor jacket 150 is utilized in its so-called "cooling" mode to maintain the reaction mixture substantially at the desired steady-state reaction temperature for producing the corresponding desired polymer product.

In general, it is well known that an initiator is an agent or an ingredient that is utilized to initiate the polymerization of a particular monomer. Those skilled in the art know that most monomers polymerize optimally at certain specified temperature ranges, and that there are a variety of known initiators for many of such ranges. Accordingly, a variety of commercially-available initiators are well known.

We herein discuss using one particular combination of initiators, generally at start-up of the continuous reactor means 100. The initiator combination is accordingly utilized to initiate and control the polymerization reaction, over a generally broad temperature range, for achieving the polymerization reaction described herein. In particular, we prefer to utilize tertiary butyl peroxypivalate (TBPP), having a half-life of 1 hour at 74° C., to initiate and control the polymerization reaction at the so-called "low end" of the temperature range. Then, to initiate and control the polymerization reaction at the so-called "high end" of the temperature range, we prefer to utilize di-tertiary butyl peroxide (DTBP), having a half-life of 1 hour at 149° C. Finally, to initiate and control the polymerization reaction at that portion of the temperature range which is intermediate (i.e., generally between these two temperatures), we prefer to utilize tertiary butyl peroctoate (TBP), having a half-life of 1 hour at 95° C.

Other commercially-available initiators, suitable for purposes of the present invention, include, but are not limited to, tertiary butyl peroxy neodecanoate, having a half-life of 1 hour at 67° C.; tertiary amyl peroxypivalate, having a half-life of 1 hour at 74° C.; benzoyl peroxide (BPO), having a half-life of 1 hour at 91° C.; and 2,5-dimethyl-2,5-di(tertiary butyl peroxy) hexyne-3, having a half-life of 1 hour at 149° C.

Still further, in certain situations it may be desirable to further broaden the temperature range, over which the desired polymerization reaction is initiated and controlled. Accordingly, other well-known commercially-available initiators, such as cumene hydroperoxide, having a half-life of 1 hour at 190° C., can be utilized for such a purpose if desired.

Those skilled in the art can appreciate, therefore, that the choice of a particular reaction temperature—for achieving incipient polymerization of a particular polymer (that is to be produced), at optimal temperature for conversion, as well as for achieving steady-state polymerization of such a polymer—is related to the initiator that is chosen.

Yet, it may at times be desirable to make a composition-of-matter having a relatively lower number-average of weight-average molecular weight than what is disclosed herein. In such a case, the temperature of reaction would be higher than what is disclosed herein; and the reactor residence time would be less than what is disclosed herein. Moreover, in yet another case where a relatively greater molecular weight is desired, the temperature of reaction would be lower (than what is disclosed herein); and the reactor residence time would accordingly be greater.

Therefore, further in accordance with yet another aspect or feature of the present invention, the preferred incipient polymerization reaction temperature is about 68° to about 72° C., more preferably about 70° C.; and the preferred steady-state polymerization reaction temperature is about 150° to about 175° C., more preferably about 150° to about 160° C.

Further discussing that which is illustrated in FIG. 1, it can be seen that the system can include a flow-control means 162, which can for example be a microprocessor, for substantially continuously controlling the addition rate of any one, or all if desired, of the ingredients being supplied to the agitated continuous reactor means 100.

For example, a suitable, commercially-available flow-control means could be utilized to substantially continuously control the addition rate of each of the solvent, the MAH, the alpha-olefin (or, alternatively, a particular alpha-olefin mixture, as mentioned above), as well as any particular initiator (as well as any particular combination of initiators) that is employed. Specifically, such a flow-control means could, for example, utilize the illustrative automatic flow-control valves 164, 166, 167, 168 and 169, respectively, to achieve individually-controlled addition rates. Such addition, moreover, can be made utilizing the flow-control means 162, in a well-known manner. In particular, flow-control means 162 can be operatively connected to each one of the five independently-operating automatic flow-control valves 164, 166, 167, 168 and 169, for respectively controlling flow to the continuous reactor means 100 of the solvent, the MAH and alpha-olefin monomeric reactants, and the initiator.

To effect such a result, the control means 162 can, for example, utilize a temperature-control probe 172 operatively connected to the flow-control means 162 and having a temperature-sensing portion that is disposed either specifically into the reaction zone or generally into the reaction mixture. The temperature-control probe 172, furthermore, can be adapted in a well-known manner to "sense" the temperature of the reaction mixture and to transfer such reaction-mixture temperature information to the flow-control means 162. The result of such a transfer of temperature-control information is that the control means 162 can be made to control the operation of the automatic valves 164, 166, 167, 168 and 169, for independently controlling flow of the solvent, the monomeric reactants, and the initiator, respectively, into the continuous reactor means 100. In particular, by controlling operation of automatic valve 169, the flow-control means 162 can control the amount of initiator that is added to the continuous reactor means 100 via the conduits 130 and 158.

The addition rates of the MAH and alpha-olefin reactants are generally controlled substantially continuously during the course of the desired polymerization reaction. Solvent is added to the continuous reactor means 100, also at a generally fixed rate, throughout the course of the polymerization reaction. Initiators, on the other hand, are added to the continuous reactor means 100 at discrete time intervals during the course of the reaction. For instance, as illustrated in EXAMPLE 2 below, one particular flow rate is utilized for the initiator mixture at start-up, while a lesser initiator flow rate is utilized at stready-rate conditions.

Prior to the initiation of polymerization (and with the continuous reactor means 100 empty), the alpha-olefin (or alpha-olefin mixture), as well as the solvent that is utilized, are typically added to the continuous reactor means 100 at room temperature. Those skilled in the art can appreciate that the MAH must be heated to a temperature of at least about 60° to about 65° C. prior to being added to the continuous reactor means 100. Upon initiation of the desired polymerization reaction, and because the reaction is exothermic (as mentioned above), the reactor-contained reaction mixture increases in temperature.

As also mentioned above, one particular, preferred combination of initiators is utilized to control initiation of the polymerization reaction, at start-up of the continuous reactor means 100, to bring the reactor contents up from the desired incipient polymerization temperature to the desired steady-state polymerization temperature. Such an increase in the temperature of the reactor-contents takes place in that time period that additional solvent as well as the additional MAH and alpha-olefin monomeric reactants (at the temperatures mentioned immediately above) are added to the reactor-contained reaction mixture.

Some of the exothermic heat of reaction is used to bring the additional or so-called "fresh" solvent as well as the fresh MAH and alpha-olefin monomeric reactants to the temperature of the reaction mixture, as the reactor-contained reaction mixture polymerizes).

In addition, reactor jacket 150 can be operated in its "cooling" mode to control the temperature of the reactor-contained reaction mixture when desired.

Still discussing the process and system illustrated by FIG. 1, it can be seen that the desired polymer product can be conveyed directly from the continuous reactor means 100 via a conduit 173 to separate facilities 186 for storage or further processing, as desired.

Alternatively, the polymer-containing reaction mixture can be conveyed from the continuous reactor means 100 via a conduit 174 to a conventional polymer-separation facilities 176, for continuously separating the produced polymer from the remainder of the reaction mixture, if desired.

For example, in the case where the continuous reactor means 100 is a plug-flow (sometimes called a "tubular") reactor, it might be desirable to produce an ultra solvent-free polymer. For example, it might be desirable to use a certain processing step, other than a generally known decantation step, to separate the polymer that is produced from the solvent that is present. To that end, those skilled in the art can appreciate that the facilities 176 can include means for separating the polymer product from the minimal residual amount of solvent that is present with the polymer product, to thereby produce the desired ultra solvent-free polymer. Further, the thus-separated solvent can be returned to the solvent source 110, or recycled back to the reactor means 100 via a conduit 180, as desired.

Moreover, in the case where the continuous reactor means 100 is a continuous stirred-tank reactor (CSTR), it might be desirable to separate the thus-produced polymer not only from the solvent but also from any residual (or unreacted) monomeric reactant that is present. Accordingly, those skilled in the art can similarly appreciate that the facilities 176, in addition to, or in the alternative, can include means for separating the polymer product from any residual or unreacted monomeric reactant that is present. To that end, any monomeric reactant thus separated from the polymer product can be recycled back to the reactor means 100 via a conduit 182 if desired.

In either case, or in both cases, the desired, separated polymer product can thereafter be conveyed from facilities 176 via a conduit 184 to the above-mentioned facilities 186.

Illustrative of alpha-olefins, suitable for use in accordance with the principles of the present invention, are 1-decene, 2,3-dimethyl-1-butene, 4,4-dimethyl-1-heptene, 3,3-dimethyl-1-hexene, 3,3-dimethyl-1-pentene, 1-docosene, 1-dodecene, 1-dotetracontene, 1-dotriacontene, 1-eicosene, 3-ethyl-1-docosene, 3-ethyl-1-dodecene, 1-heptadecene, 1-heptene, 1-hexacontene, 1-hexacosene, 1-hexadecene, 1-hexatetracontene, 1-hexatriacontene, 1-hexene, 2-methyl-1-butene, 3-methyl-3-ethyl-1-pentacosene, 3-methyl-1-hexacosene, 2-methyl-1-heptadecene, 2-methyl-1-heptene, 2-methyl-1-pentene, 4-methyl-1-pentene, 5-methyl-1-undecene, 1-nonene, 1-octacosene, 1-octadecene, 1-octatetracontene, 1-octatriacontene, 1-octene, 1-pentacontene, 1-pentacosene, 1-pentene, 3-propyl-1-heptatriacontene, 1-tetracontene, 1-tetracosene, 1-tetradecene, 1-tetratetracontene, 1-tetratriacontene, 1-triacontene, 1-tricosene, 1-tridecene, 1-tritriacontene, and mixtures thereof.

While it is suitable for purposes of the present invention that the molar ratio of MAH to alpha-olefin be about 1:1, it is preferable, to have an excess of MAH in the reaction mixture. For example, while the molar ratio of the MAH to alpha-olefin (i.e., MAH:alpha-olefin), in the reaction mixture, can be from about 1:1 to about 10:1, the molar ratio is preferably from about 1.5:1 to about 2:1, more preferably about 1.8:1.

As briefly mentioned above, the solvent should of course not be a solvent having groups that are reactive with MAH—such as hydroxyl-containing, carboxyl-containing, or aldehyde-containing reactive groups (or moieties)—as these would tend to undesirably react with any MAH present. Suitable solvents, in accordance with the principles of the present invention, therefore include the aliphatic and alicyclic halogen-containing compounds, such as $CH_2Cl_2$ and 1,3-dichloropropane. Accordingly, the solvent may in general be any solvent having groups that are not maleic anhydride-reactive—such as an ester or an aromatic—and which is a liquid at the steady-state polymerization reaction pressure and temperature contemplated.

Examples of suitable esters include, but are not limited to, the acetates, the so-called "higher" monobasic and polybasic aliphatic esters, as well as certain aromatic esters, such as benzoates and phthalates.

Nonlimiting examples of aromatic hydrocarbons that are suitable as a solvent in accordance with the principles of the present invention include benzene, toluene, and the various isomers of xylene. An example of a suitable halogenated aromatic compound is chlorobenzene.

Preferably, the solvent is selected from the group consisting of propylene glycol methyl ether acetate (P M acetate) butyl acetate, and methyl isobutyl ketone (MIBK).

The polymerization of the maleic anhydride with the alpha-olefin or alpha-olefin mixture utilized can be initiated by any free radical-producing material well known in the art. For example, in accordance with the principles of the present invention, certain well-known free radical-producing materials include, but are not limited to, the peroxide-type polymerization initiators and the azo-type polymerization initiators.

Such a peroxide-type free-radical initiator can be inorganic or organic. Further, such organic peroxides can have the general formula $R_1OOR_2$, where $R_1$ can be any organic radical, and where $R_2$ can be selected from the group consisting of hydrogen and any organic radical. Illustrative of such peroxides are the di-aroyal and di-acyl peroxides. In particular, $R_1$ and $R_2$ can both be organic radicals—such as a hydrocarbon, an aroyal, or an acryl radical. Moreover, any such radical may include other substituents, such as halogens, if desired.

Accordingly, specific examples of suitable peroxides, which examples are in no way limiting, include acetyl hydroperoxide, benzoyl peroxide, cumene hydroperoxide, diacetyl peroxide, 2,4-dichlorobenzoyl peroxide, diethylperoxy carbonate, lauroyl peroxide, tertiary butyl hydroperoxide, tertiary butyl perbenzoate, and tertiary butyl peroxide. Further examples of suitable initiators include a variety of other free radical-initiating compounds such as the perborates.

Suitable azo-type free radical-initiating substances include alpha,alpha'-azo-bis-isobutyronitrile, and the like. Other suitable azo-type compounds include, but are not limited to, para-bromobenzene diazonium fluoborate, para-tolyl diazoaminobenzene, para-bromobenzene diazonium hydroxide, azo-methane, and the phenyldiazonium halides.

Radiation, which includes ultraviolet (UV) radiation, can also be used, when desired, to initiate the reaction, if a suitable photoinitiator is utilized.

The amount of initiator employed, exclusive of radiation, depends to a large extent on the particular initiator chosen, the particular alpha-olefinic charge stock that is being utilized as well as a variety of polymerization reaction conditions. Also, the initiator must of course be soluble in the reaction mixture. Generally, the molar concentration ratios of initiator-to-MAH are about 0.001:1 to about 0.02:1, moles of initiator per mole of MAH, with preferred molar concentration ratios of initiator-to-MAH being about 0.005:1 to about 0.03:1. In general, the more reactive alpha-olefins, such as vinyl-type alpha-olefin monomers, require relatively lesser amounts of initiator.

The polymerization temperature must be sufficiently high not only to thermally decompose the initiator, for producing the desired free-radical polymerization reaction-initiating substance or material, but also to maintain the produced polymer in solution in the monomer as described above. For example, to effect thermal decomposition when using DTBP (as the initiator), the polymerization temperature is preferably about 150° to about 160° C.

The reaction pressure can, of course, be atmospheric; but superatmospheric pressures of up to about 600 psig (pounds per square inch gauge) or higher can be used and are generally preferred.

Moreover, the time to complete the reaction is usually about 10 minutes or less; and many times about 5 minutes or less. Yet, those skilled in the art can appreciate that under certain conditions—such as when the reaction temperature and/or pressure are varied, or when the alpha-olefin (or alpha-olefin mixture) is varied—that longer reaction times of, say, about 20 to about 30 minutes, or more, may be desirable.

FIG. 2 is a schematic drawing of yet another system embodying the principles of the present invention. In this embodiment, the continuous reactor means 200 comprises a so-called "continuous stirred-tank reactor" (CSTR) 202 and a plurality of static mixers (i.e., so-called "plug-flow" or tubular reactors having internally-fixed liquid-mixing elements therein) 204 located downstream of CSTR 202. Moreover, as is illustrated, the agitated reactor 202 as well as each one of the plural static mixers 204 can have its own separate cooling-/heating means 251 and 252, respectively, to maintain the desired temperature for the reaction mixture in the continuous reactor means 200.

As mentioned above, the alpha-olefin utilized can be a mixture of two or more different alpha-olefins. The illustrated alpha-olefin source 220 thus can comprise a source 222 for the one alpha-olefin as well as another source 224 for one other alpha-olefin. Further, each such alpha-olefin source 222 and 224 can have its own heating means 243 and 244, respectively, if desired.

An agitated vessel or kettle 226 is preferably utilized to pre-blend the different alpha-olefins, and to maintain these alpha-olefins in a well-mixed state prior to the introduction of this alpha-olefin mixture to the continuous reactor means 200. Alternatively, a static mixer can be utilized for pre-blending the alpha-olefins and for maintaining the alpha-olefins in a well-mixed state.

It is generally preferable to utilize only one initiator for simplicity of operation and for other economic reasons. However, in the illustrated system, a combination of ingredients was employed at start-up, for reasons that can be appreciated by those skilled in the art; and the illustrated initiator source 254 accordingly can comprise one initiator source 255 and at least one other initiator source 256.

Still further, because it is generally desirable to individually control the flow to the continuous reactor means 200, of the MAH and alpha-olefin reactants, the initiator or initiators utilized, and the solvent, a plurality of pumping means such as the illustrated, individual metering pumps 288, 289, 290, 291 and 292, respectively, can be used for such a purpose.

Alternatively, in the event that only one initiator pump 291 or 292 is required, a conduit 287 can be utilized to supply initiator from either illustrated initiator source 255 or 256 (or both initiator sources 255 and 256) to such pump, if desired.

In certain situations, it is desirable not only to control the addition rate of one of the initiators into the CSTR 202 but also to separately control the addition rate of such initiator into the static-mixer train as well. Specifically, in such situations, it is oftentimes desirable to control the addition rate of such initiator to the partially-reacted reaction mixture, being discharged from the CSTR 202, before such partially-reacted reaction mixture is introduced into the static mixers 204.

Accordingly, one manner of controlling the addition rate of such initiator into the CSTR 202 and/or into the static mixers 204 contemplates measuring a predetermined process parameter of the reaction mixture as the mixture exits the last static mixer 204. Thereafter, such process measurement information can be conveyed, for example via a communication link 293, to a suitable process-control device 294. The process-control device 294 can, in turn, be operatively connected to an automatic flow-control valve 295, in a well-known manner, to control the flow of such initiator, generally in the manner described above. Alternatively, in other situations, the degree of conversion can be determined using, for example, an on-line analyzer (not shown) for process-control purposes.

As further illustrated in FIG. 2, it can be seen that the desired polymer product can be conveyed directly from the continuous reactor means 200 via a conduit 273 to separate facilities 286 for storage or further processing, as desired.

Alternatively, the desired polymer product, exiting the last static mixer 204, can be conveyed via a conduit 274 to suitable polymer-separation facilities 276, for stripping any solvent that is present and/or recovering unreacted monomeric reactant from the polymer product. As mentioned above in connection with the description of FIG. 1, any recovered solvent and any recovered unreacted monomer can be returned to CSTR 202 via respective conduits 280 and 282 if desired. Exiting the polymer-separation facilities 276, the thus-separated desired polymer product can be conveyed via a conduit 284 to the facilities 286 for further processing or for storage, as desired.

The following examples are set forth to further illustrate the principles and practice of this invention to one skilled in the art. As such, they are not intended to limit the invention but are merely illustrative of certain preferred embodiments. For the various examples set forth herein, the molecular weight of the polymer product was determined by gel permeation chromatography (GPC).

EXAMPLE 1

PROCEDURE FOR PRODUCING DESIRED POLYMER PRODUCT UTILIZING SYSTEM DEPICTED IN FIG. 2

222.7 grams per minute of maleic anhydride (MAH) and 236.4 grams per minute of $C_{10}$ alpha-olefin commonly known as "decene", which are herein referred to as the "monomeric reactants", were combined and pumped at a temperature of about 70° C. into the CSTR 202. (The molar ratio of the MAH to the alpha-olefin was about 1.35:1.) The volume of the CSTR 202 was about 1 liter. The temperature of the CSTR heating jacket 251 was set at a temperature of about 70° C. PM acetate solvent, at a rate of 18.2 grams per minute, was pumped into the CSTR 202. An initiator mixture—comprising tertiary butyl peroctoate (TBP), tertiary butyl peroxy pivilate (TBPP) and di-tertiary butyl peroxide (DTBP), all initially at room temperature—was also pumped into the CSTR 202. The addition rate, initially, of the TBP was 5.80 grams per minute, of the TBPP was 4.68 grams per minute, and of the DTBP was 3.92 grams per minute. In this example, the amount of solvent present in the reactor-contained reaction mixture, accordingly, was about 4 (specifically, 3.8) weight percent, based upon the weight of the reaction mixture. Moreover, the reaction-mixture residence time in the CSTR 202 and in the static-mixer train was about 2 minutes in each. The reaction mixture had a density of about 0.9 grams per cubic centimeter.

The MAH and $C_{10}$ alpha-olefin reactants began polymerizing at a temperature of about 70° C. Because the polymerization reaction is exothermic, the reactor-contained mixture increased in temperature from the above-mentioned incipient reaction temperature (i.e., about 70° C.) to a desired steady-state reaction temperature of about 160° C.

About 10 minutes after the above-identified ingredients were combined and pumped into the CSTR 202, as the temperature in the CSTR 202 became higher than about 120° C. (.e., as the desired steady-state reaction temperature was approached), the mixture of initiators was replaced by DTBP alone, at a rate of 4.87 grams per minute.

About 2 minutes thereafter, it was determined that equilibrium had been achieved not only in the CSTR 202 but also in the several static mixers 204 as well. In particular, the measured reaction mixture temperature was observed to be substantially uniform along the various elements of the continuous reactor means 200, with a temperature gradient of about 4° C. or less being observed as between the CSTR 202 and any one of the several static mixers 204. The volume of the several static mixers 204, considered together, was about 1.1 liters.

Exiting the CSTR 202, the perent conversion of the reactants to the desired polymer product was about 50%, based on conversion of MAH. Exiting the last static mixer 204, the conversion of reactant to desired polymer product was about 99%, based on conversion of MAH.

Upon exiting the last static mixer 204, the exit stream had a viscosity of about 1600 centipoises at about 160° C.; and the polymerization reaction was deemed completed at about 99% conversion. Thereafter, the solvent and residual monomer were stripped from the polymer-containing exit stream, leaving behind the desired polymer product. The desired polymer product was subjected to analyses and the results of such analyses are summarized in Table I below.

TABLE I:

| SUMMARY OF POLYMER PRODUCED VIA EXAMPLE 1 | |
|---|---|
| $M_w$ | 6040 |
| $M_n$ | 2730 |
| Mw/Mn | 2.21 |
| $M_z$ | 13510 |
| Mz/Mn | 4.95 |

EXAMPLE 2

PROCEDURE FOR PRODUCING ANOTHER DESIRED POLYMER PRODUCT UTILIZING SYSTEM DEPICTED IN FIG. 2

163.6 grams per minute of MAH, 97.9 grams per minute of $C_8$ alpha-olefin, and 222.5 grams per minute of a $C_{18}$ alpha-olefin, all collectively referred to in this example as the "monomeric reactants", were combined and pumped, at a temperature of about 70° C., into the CSTR 202. (The molar ratio of the MAH to the alpha-olefin mixture was about 1:1.) The temperature of the CSTR heating jacket 251 was set at a temperature of about 70° C. 49.5 grams per minute of PM acetate solvent was added to the CSTR 202. An initiator mixture—comprising TBP, TBPP, and DTBP, initially at room temperature—was also pumped into the CSTR 202. The addition rate of the TBP was 9.02 grams per minute, of the TBPP was 5.46 grams per minute, and of the DTBP was 1.52 grams per minute. The reaction mixture, thus contained in the CSTR 202, comprised the solvent, the monomeric reactants, the initiator mixture and any polymer product. (Such reaction mixture had a density of about 0.85 grams per cubic centimeter.) In this example, the amount of solvent present in the reactor contained reaction mixture was about 9 (specifically, 9.1) weight-percent based upon the weight of the reaction mixture.

As soon as the CSTR 202 was filled with the reaction mixture, the pumping rate of the feed stream into the CSTR 202 was halted to increase the residence time in the CSTR 202 an additional 7 minutes. The monomeric reactants began polymerizing at about 70° C. Because the reaction is exothermic, the reactor-contained reaction mixture increased in temperature, to about 120° C., at which point, feed was again brought into the CSTR 202 at 70° C. Within about 8 minutes thereof, a desired steady-state reaction temperature of about 165° C. was achieved in the continuous reactor means 200, with an observed temperature gradient of about 10° C. or less being present as between the CSTR 202 and any one of the several static mixers 204.

Exiting the CSTR 202, the conversion of reactants to the desired polymer product was about 40%, based on conversion of MAH. Exiting the last static mixer 204, the conversion of reactants to the desired polymer product was about 98%, based on conversion of MAH.

Upon exiting the last static mixer 204 the exit stream had a viscosity of about 800 centipoises at about 165° C.; and the polymerization reaction was deemed completed at about 98% conversion. Thereafter, the solvent and residual monomer were stripped from the polymer-containing exit stream, leaving behind the desired polymer product. The desired polymer product was subjected to analyses and the results of such analyses are summarized in Table II below.

TABLE II:
SUMMARY OF POLYMER PRODUCED BY EXAMPLE 2

| $M_w$ | $M_n$ | Mw/Mn | $M_z$ | Mz/Mn |
|---|---|---|---|---|
| 6690 | 3100 | 2.16 | 12230 | 3.95 |

What has been illustrated and described herein is a novel process and styrene for producing a polymer comprising maleic anhydride and alpha-olefin monomeric units. While the process and system of the present invention have been illustrated and described with reference to a number of preferred embodiments, the present invention is not limited thereto. On the contrary, alternatives, changes and modifications will become apparent to those skilled in the art upon reading the foregoing description. Accordingly, such alternatives, changes and modifications are to be considered as forming a part of the invention insofar as they fall within the spirit and scope of the appended claims.

We claim:

1. A continuous process for producing a polymer comprising maleic anhydride and alpha-olefin monomeric units, comprising:

combining, with agitation and in a reaction zone, monomeric reactants comprising maleic anhydride and alpha-olefin having about 6 to more than about 30 carbon atoms, in the presence of a minimal effective amount of solvent, to produce a polymerizable reaction mixture, the solvent being present at about 2 to about 9 weight percent based upon the weight of the reaction mixture;

heating the polymerizable reaction mixture;

adding to the heated, polymerizable reaction mixture at least one thermally-decomposable initiator to initiate the polymerization reaction, for causing polymerization of the maleic anhydride with the alpha-olefin, thereby producing the polymer;

controllably and continuously adding to the reaction mixture an effective additional amount of the monomeric reactants as well as the minimal effective amount of solvent, for maintaining production of the polymer, whereby the time to complete the reaction is about 10 minutes or less; and continuously removing the thus-producing polymer from the reaction zone.

2. The process in accordance with claim 1 wherein the solvent is present at about 4 to about 9 weight percent.

3. The process in accordance with claim 1 further comprising the steps of:

stripping unreacted monomer and reaction-mixture solvent from the removed polymer;

recovering the monomer-and-solvent stripped polymer; and returning the stripped, unreacted monomer to the reaction mixture.

4. The process in accordance with claim 1 wherein the solvent is selected from the group consisting of propylene glycol methyl ether acetate, butyl acetate, and methyl isobutyl ketone.

5. The process in accordance with claim 1 wherein the molar ratio of the maleic anhydride to the alpha-olefin in the reaction mixture is about 1:1 to about 10:1.

6. The process in accordance with claim 1 wherein the molar ratio of the maleic anhydride to the alpha-olefin in the reaction mixture is about 1.8:1.

7. The process in accordance with claim 1 wherein the molar ratio of the maleic anhydride to the alpha-olefin in the reaction mixture is about 1.5:1 to about 2:1.

8. The process in accordance with claim 1 wherein the thermally-decomposable initiator is selected from the group consisting of a first initiator having a half-life of about 1 hour at about 74° C., a second initiator having a half-life of about 1 hour at about 95° C., a third initiator having a half-life of about 1 hour at about 149° C., and mixtures thereof.

9. The process in accordance with claim 8 wherein the first initiator is tertiary butyl peroxy pivilate, wherein the second initiator is tertiary butyl peroctoate, and wherein the third initiator is di-tertiary butyl peroxide.

10. The process in accordance with claim 1 wherein the polymerization of the maleic anhydride with the alpha-olefin occurs at a predetermined polymerization reaction temperature, and wherein the predetermined polymerization reaction temperature is about 150° to about 160° C.

11. The process in accordance with claim 1 wherein the alpha-olefin is a mixture comprising at least one alpha-olefin and one other alpha-olefin of different carbon chain length.

* * * * *